Sept. 8, 1970     L. B. BOURGEAULT     3,527,994

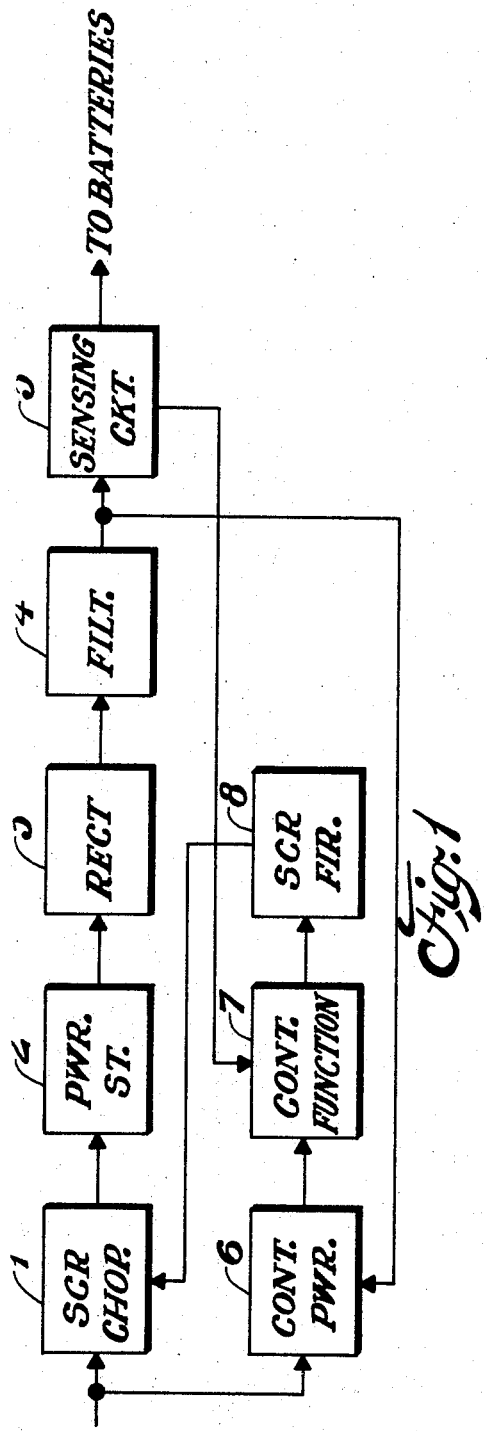
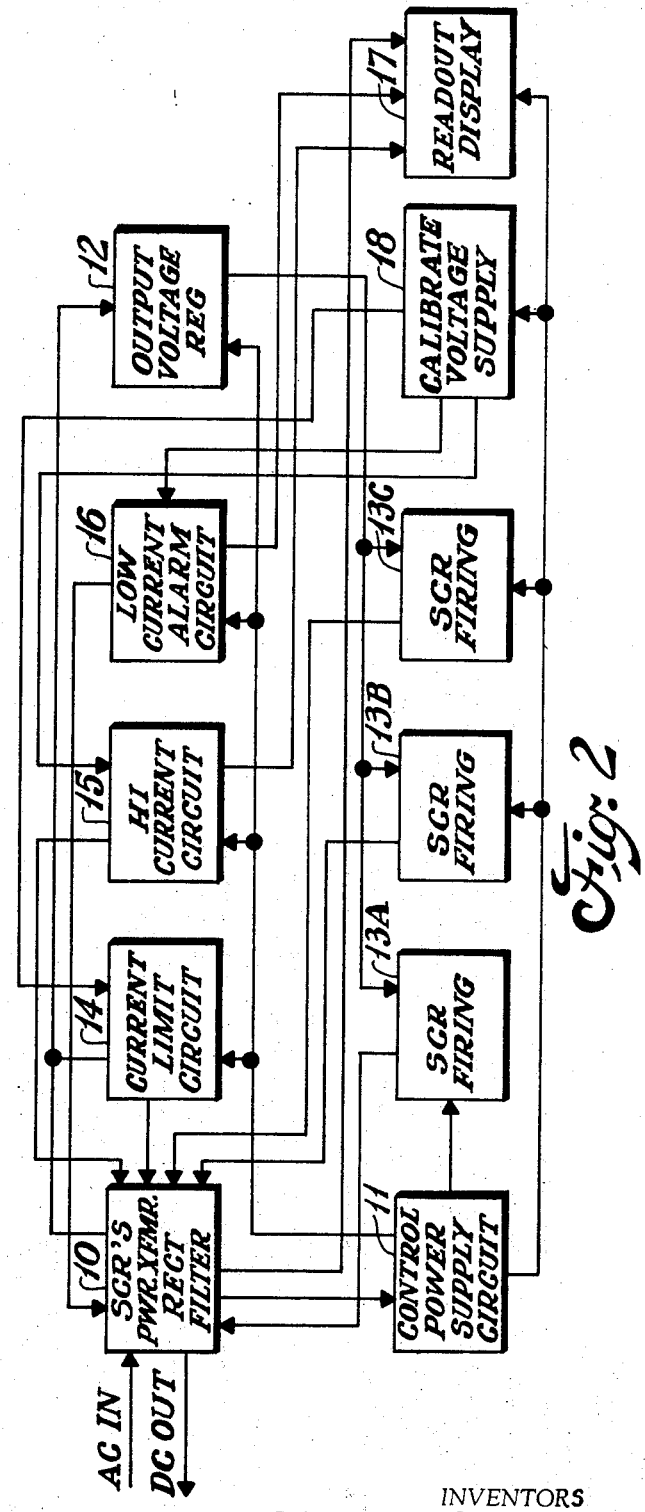

SCR BATTERY CHARGER WITH TUNNEL DIODE CURRENT CONTROLS

Filed July 12, 1966     7 Sheets-Sheet 2

INVENTORS
LEO B BOURGEAULT
ALBERT W. COMPOLY
ALFRED W. WOHLBERG

ATTORNEY

INVENTORS
LEO B. BOURGEAULT
ALBERT W. COMPOLY
ALFRED W. WOHLBERG

ATTORNEY

INVENTORS
LEO B. BOURGEAULT
ALBERT W. COMPOLY
ALFRED W. WOHLBERG

ATTORNEY

United States Patent Office 3,527,994
Patented Sept. 8, 1970

1

3,527,994
SCR BATTERY CHARGER WITH TUNNEL
DIODE CURRENT CONTROLS
Leo B. Bourgeault, Spring Lake Heights, Alfred W. Wohlberg, Neptune, and Albert W. Compoly, Marlboro, N.J., assignors to The Bendix Corporation, a corporation of Delaware
Filed July 12, 1966, Ser. No. 564,612
Int. Cl. H02j 7/10
U.S. Cl. 320—39                                    5 Claims

ABSTRACT OF THE DISCLOSURE

A battery charger utilizing SCR's to chop the A.C. sine wave voltages into pulses to produce a regulated D.C. voltage of a constant potential and the current is controlled to reduce the charging current to a safe value as the batteries reach a full charge by circuits controlling the conduction of the SCR's.

---

The present invention relates to converters and more particularly to a precisely regulated converter for charging heavy duty batteries.

In charging batteries the amount of power required varies with the state of charge of the battery. Excessive charging current causes severe damage to the battery as with overcharging.

The present invention provides a regulated D.C. voltage for charging batteries in which excess charging current and overcharging problems are eliminated. Control circuitry automatically reduces the charging current to a safe value as the batteries reach their state of full charge.

It is an object of the invention to provide an improved battery charger.

Another object of the invention is to provide an improved converter.

Another object of the invention is to provide novel control circuitry for a converter.

Another object of the invention is to provide an improved converter utilizing silicon controlled rectifiers.

The above and other objects and features of the invention will appear more fully hereinafter from a consideration of the following description taken in connection with the accompanying drawings wherein one example is illustrated by way of example.

In the drawings:

FIG. 1 is a block diagram illustrating the functions of the system.

FIG. 2 is a block diagram schematic layout.

Figure 3:
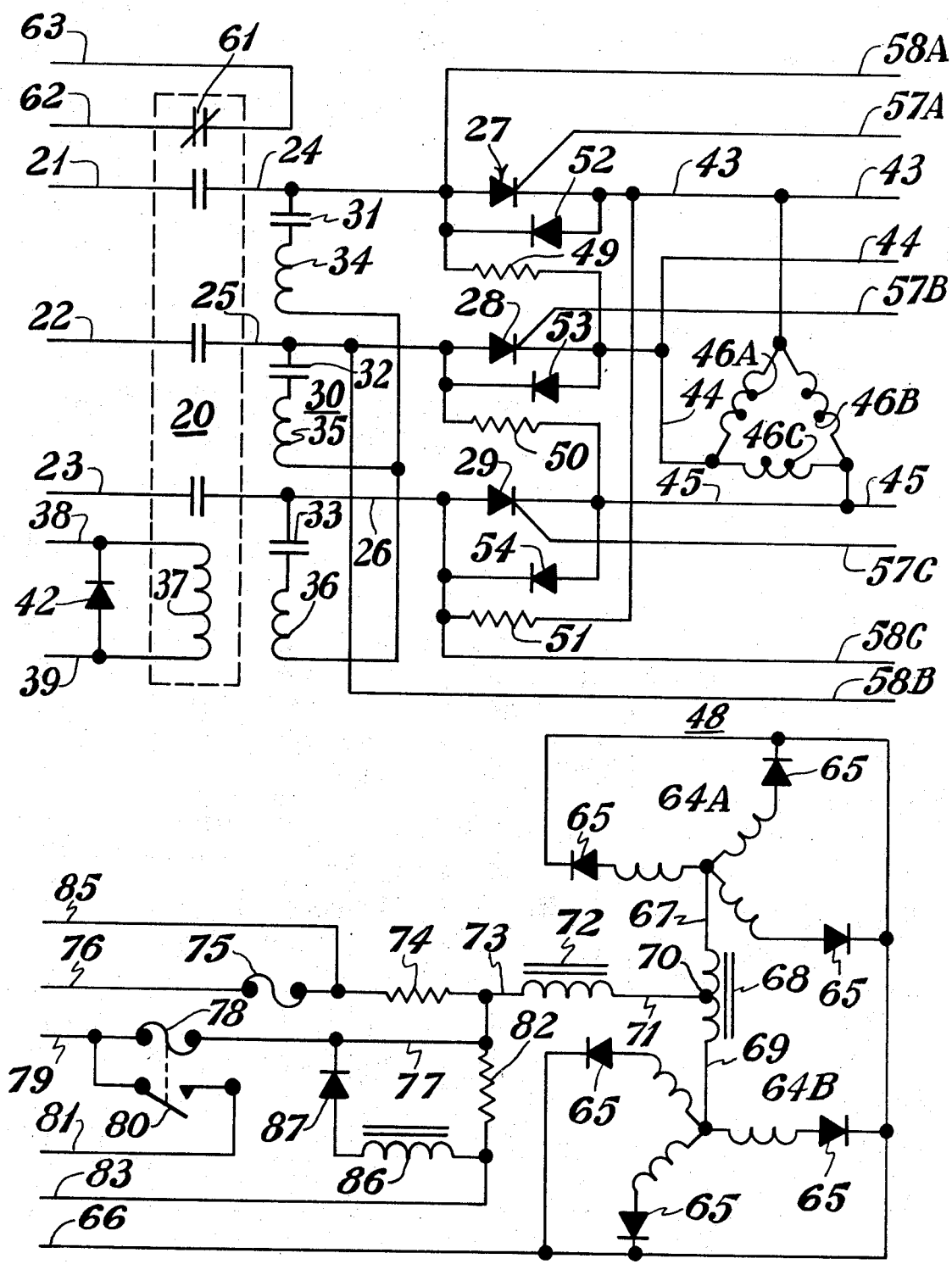
FIG. 3 is a schematic diagram of the silicon controlled rectifiers, transformers, rectifiers, and filter circuits.

Referring now to FIG. 1 of the drawing, A.C. power enters Block 1 where it is chopped by silicon controlled rectifiers (SCR's) into pulses of proper width to supply

2 the power demanded by the load. In Block 2, the pulses are transformed to change the voltage to a predetermined level. In Block 3 a rectifier assembly converts the A.C. voltage into a D.C. voltage. The D.C. voltage is then filtered in Block 4 to reduce the ripple.

The filtered voltage from Block 4 then passes through the sensing circuits, Block 5, and then to the batteries. Part of the D.C. output is fed back from the sensing circuits, to the control power circuit, Block 6, which supplies power for the control functions, Block 7. The control power circuit, Block 6, also has an input from the A.C. line, thus providing a dual source of power. The control functions regulates the level of the D.C. voltage, limits the maximum output current, shuts down the system upon a malfunction occurring, provides readout functions and provides a control signal for the SCR firing circuit, Block 8. The SCR firing circuit, Block 8, controls the phase back firing angle of the SCR's to provide the proper amount of power required by the load.

Referring now to the block diagram of FIG. 2, Block 10 represents the SCR's, power transformers, rectifier and filter and is illustrated in detail in FIG. 3. A.C. is connected to the input and is also connected to the input of the control power supply circuit, Block 11, illustrated in FIG. 4. The rectified output is connected to a suitable load. Also a portion of the output is connected to the input of output voltage regulator, Block 12, illustrated in FIG. 5. Input signals are fed into the Block 10 from the SCR firing circuits, Blocks 13A, 13B and 13C. Also signals are fed into Block 10 from current limiter circuit, Block 14, high current circuit, Block 15 and low current alarm circuit, Block 16. Connections are also provided from Block 10 to a readout display, Block 17.

Power from the control power supply circuit, Block 11, is connected to the SCR firing circuits, Blocks 13A, 13B and 13C. Also power is supplied to the readout display, Block 17, and to a calibrated voltage supply, Block 18. Further, power from Block 11 is connected to current limit circuit Block 14, high current circuit Block 15, low current circuit Block 16 and output voltage regulator Block 12.

The current limit circuit Block 14 has an output connected to the output voltage regulator Block 12 which furnished a control signal to the SCR firing circuits 13A, 13B and 13C. The high current circuit Block 15 and low current circuit Block 16 each have a circuit to the readout display Block 17.

Referring now to FIG. 3 for a detailed explanation of the circuitry of Block 10 of FIG. 2, a circuit breaker 20 has A.C. input lines 21, 22, and 23 connected to the input thereof. Output lines 24, 25 and 26 are connected to the input of respective silicon controlled rectifiers (SCR's) 27, 28 and 29. A filter network 30 which includes capacitors 31, 32 and 33 and inductances 34, 35 and 36 are connected across the input lines 21, 22 and 23. The switch 20 has an operating coil 37, one side of which is connected by conductor 38 to conductor 128 of FIG. 4. The other side is connected by conductor 39 to contact 40 of switch 41 of FIG. 10. Diode 42 is connected across the coil 37 and prevents damage from inductive energy at shut down.

The output of the SCR's 27, 28, and 29 are connected by conductors 43, 44, and 45 to delta connected primary windings 46A, 46B, and 46C of a stepdown transformer 48. Resistors 49, 50, and 51 provide a dummy load for the SCR's and maintain holding current in the SCR's when the load is drawing insufficient current to do so. Diodes 52, 53, and 54 provide a circuit path for current to flow around the SCR's from the other phases and also clamps the reverse voltage across the SCR's to a predetermined value. The conductor 43 is also connected to one side of secondary winding 55A, FIG. 7, and the other side is connected by conductor 57A to the trigger electrode of the SCR 27. In like manner, the conductors 44 and 45 are connected to one side of windings 55B and 55C of transformers 56A and 56B, and the other side of the windings 55B and 55C are connected by conductors 57A, 57B and 57C to the respective trigger electrodes of the SCR's 27, 28, and 29 through switch 112, FIG. 11. The conductors 24, 25, and 26 are also connected by conductors 58A, 58B, and 58C to one side of primary windings 59A, 59B, and 59C respective of transformers 60A, 60B, and 60C of FIG. 7. In addition the switch 20 has a normally closed contact 61, one side of which is connected by conductor 62 to the plus DC bus while the other side is connected by conductor 63 to an outside indicator (not shown).

Figure 11:
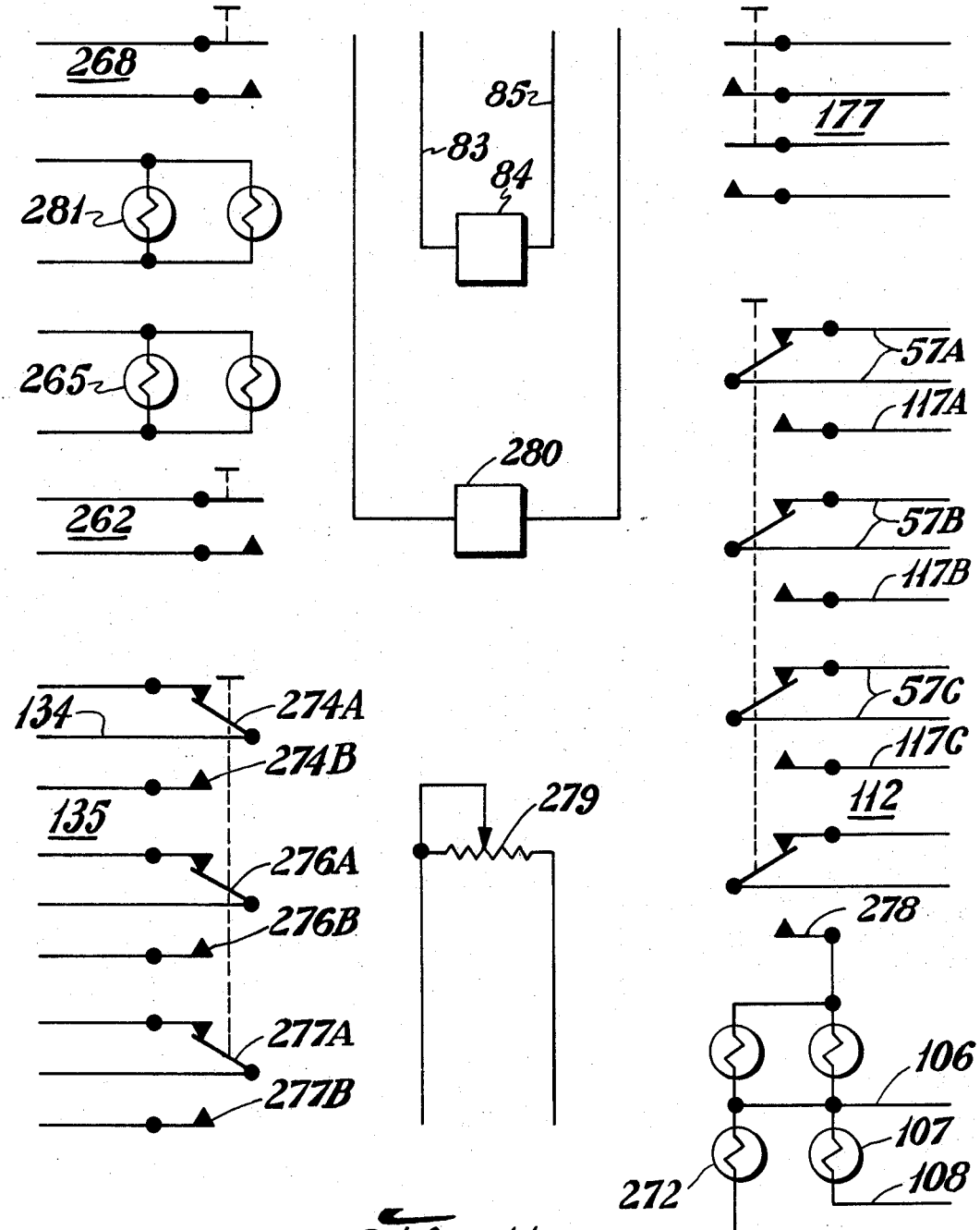
FIG. 11 is a schematic diagram of the calibration and display panel.

The transformer 48 includes a pair of secondary windings 64A and 64B connected in a Y configuration. The ends of the phase windings of the transformers 64A and 64B are connected by rectifiers 65 to conductor 66 which is connected to the positive DC bus. The junction of the windings 64A and 64B are connected together by conductor 67, interphase transformer 68 and conductor 69. The transformer 68 has a center tap 70 which is connected by conductor 71 to one side of an inductor 72. The other side of the inductor 72 is connected by conductor 73, meter shunt resistor 74, fuse 75 and conductor 76 to the negative DC bus. One source of control power is obtained by means of a conductor 77 connected to the conductor 73 and fuse 78. A switch 80 is responsive to the fuse 78 and connected between the conductor 79 and conductor 81 which goes to an external fuse alarm (not shown). A test current sensing resistor 82 has one end connected to the conductor 73 and the other side is connected by conductor 83 to one side of ammeter 84 (FIG. 11). The other side of the ammeter 84 is connected by conductor 85 to the conductor 76. An inductor 86 and diode 87 are connected across the resistor 82 and are used to simulate the ripple of resistor 74 on resistor 82 from the calibration power supply.

Figure 4:
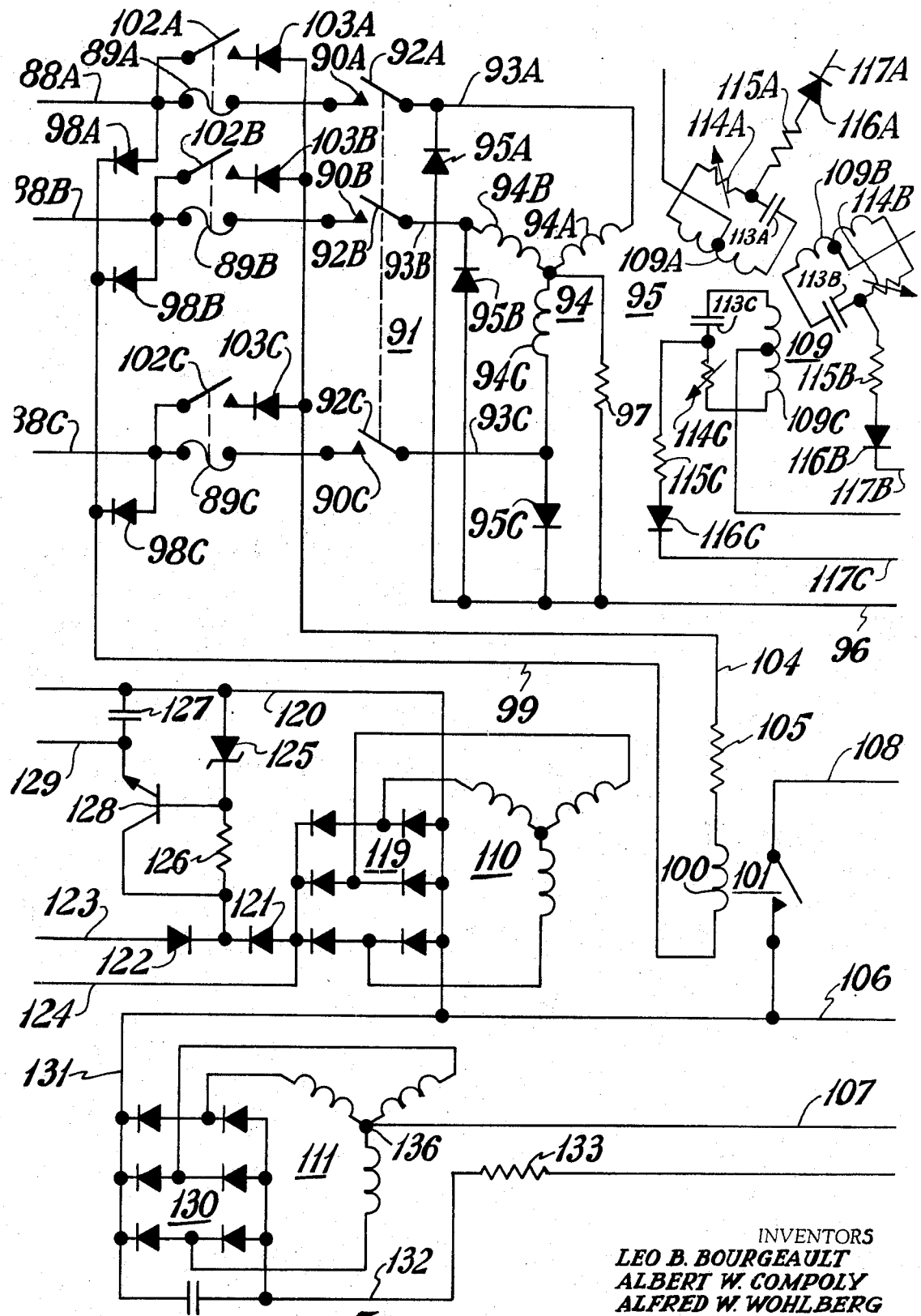
FIG. 4 is a schematic diagram of the control circuits power supply.

Referring now to FIG. 4 in which the circuit of block 11 of FIG. 2 is illustrated. AC input lines 88A, 88B and 88C are connected through fuses 89A, 89B and 89C to input contacts 90A, 90B and 90C of switch 91. Output contacts 92A, 92B and 92C of the switch 91 are connected by conductors 93A, 93B and 93C to phases A, B and C of primary winding 94 of a transformer 95.

Figure 7:
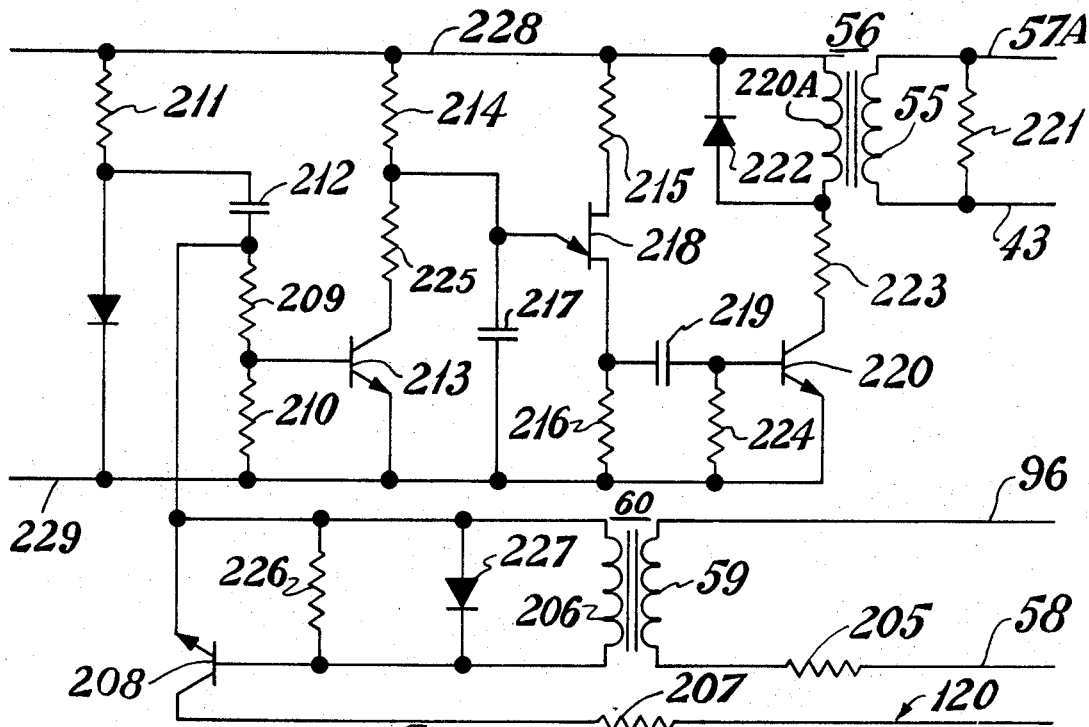
FIG. 7 is a schematic diagram of one phase of the silicon controlled rectifier firing circuit.

Rectifiers 95A, 95B and 95C have one side connected to the respective conductors 92A, 92B and 92C and the other side to conductor 96. Also a resistor 97 is connected from the midpoint of the winding 94 to the connecter 96 which is connected to one side of the winding 59 of the transformer 60 FIG. 7. The diodes 95A, 95B and 95C together with the resistor 97 form a half wave bridge and provide to reset signal for the logic in the SCR firing circuits (FIG. 7). Diodes 98A, 98B and 98C have one side connected to the conductors 88A, 88B and 88C respectively. The other side of the diodes 98A, 98B and 98C are connected by a conductor 99 to one side of coil 100 of relay 101.

Also connected to the conductors 88A, 88B and 88C are one side of switches 102A, 102B and 102C. The switches 102A, 102B and 102C are adopted for operation to a closed position upon burnout of fuses 89A, 89B and 89C. The other side of the switches 102A, 102B and 102C are connected to one side of diodes 103A, 103B and 103C, the other sides of which are connected by conductor 104 to the other side of the coil 100 of the relay 101 is connected by conductor 106 to indicator lamp 107 of FIG. 11 while the other side of the relay 101 is connected by conductor 108 to the other side of the lamp 107.

The transformer 95 has secondary windings 109, 110 and 111. The secondary winding 109 includes phase windings 109A, 109B and 109C which have capacitors 113A, 113B and 113C and ganged variable resistors 114A, 114B and 114C connected in series across each respective winding. Resistors 115A, 115B and 115C have one end connected to the junction between the capacitors 113A, 113B and 113C and resistors 114A, 114B and 114C and the other ends are connected to one end of respective diodes 116A, 116B and 116C. The other end of the diodes 116A, 116B and 116C are connected by conductors 117A, 117B and 117C to conductors 57A, 57B and 57C respectively. The winding 109 supplies power for the manual firing control of the SCR's. The resistors 114 provide means for phase shifting the SCR firing signal in order to achieve pulse width modulation for controlling the output voltage.

The secondary winding 110 of the transformer 95 has a full wave rectifier 119 connected across the output therefor. One side of the rectifier 119 is connected by conductor 120 and supplies power to the control circuits. The other side of the rectifier 119 is connected by diodes 121 and 122 and conductor 123 to the plus side of the battery and provides an alternate source of power. Also this side of the rectifiers 119 is connected by conductor 124 to the voltage regulator FIG. 5.

Zener diode 125, resistor 126, capacitor 127 and transistor 128 are connected from the conductor 120 to the junction between the diodes 121 and 122 to provide a source of regulated voltage for the control functions through the conductor 120 and conductor 129.

The secondary winding 111 of the transformer 95 also has a full wave rectifier 130 connected across the output thereof. One side of the rectifier 130 is connected by conductor 131 to the conductor 120 and also to conductor 106. The other side of the rectifier 130 is connected by conductor 132 through resistor 133 to contact 134 of switch 135 (FIG. 11). Half wave power is connected by conductor 106 to regulator (FIG. 5).

Figure 5:
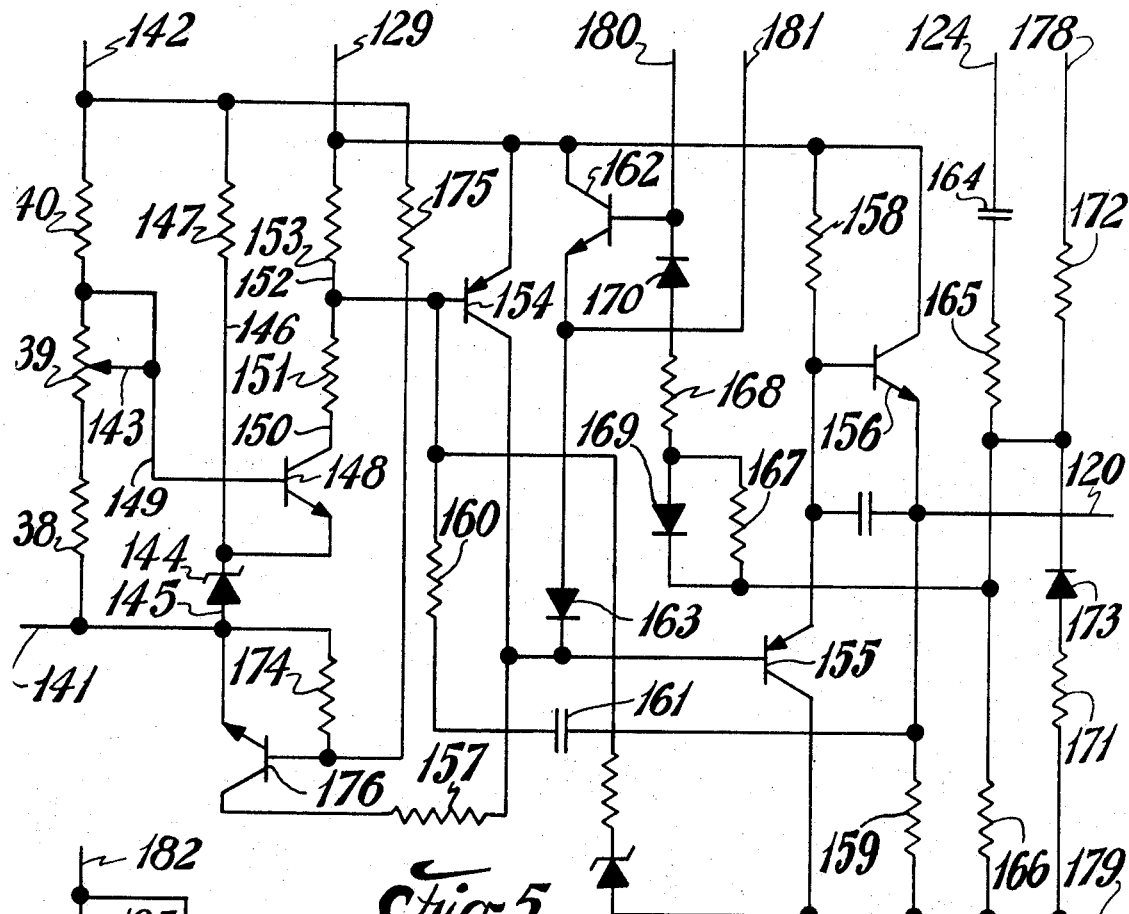
FIG. 5 is a schematic diagram of the output voltage regulator.

Referring now to FIG. 5 a voltage divider comprising resistors 138, 139 and 140 are connected across the battery by conductors 141 to the negative side and 142 to the plus side. The resistor 139 has an adjustable tap 143. A Zener diode 144 is connected by conductors 145, 146 and resistor 147 across the conductors 141 and 142 and serves as a voltage reference.

A transistor 148 is used as a sensing element and has its base connected by conductor 149 to the tap 143 on the resistor 139. The emitter of the transistor 148 is connected to the conductor 146 and the collector is connected by conductor 150 to one side of resistor 151, the other side of which is connected by a conductor 152 to one side of resistor 153. The other side of the resistor 153 is connected to the conductor 129 which is the regulated positive voltage from FIG. 4.

Transistors 154, 155 and 156 are amplifiers for the collector current from transistor 148. The resistor 153 is a current limiting resistor and provides forward bias for the transistor 154 and also provides a path for leakage current. Resistor 157 provides a load for the transistor 154. Resistors 158 and 159 are the bias and load resistors for transistors 155 and 156.

Resistor 160 and capacitor 161 form a feed back network for stability.

Transistor 162 is an amplifier tie in point for signal from the current limit control (FIG. 8) and diode 163 isolates this signal from the regulator signals. Capacitor 164, resistors 165, 166, 167, 168, diodes 169, and 170, and transistor 162 are connected in a manner to provide a soft turn-on of the system when power is initially applied. The charging current for the capacitor 164 flows substantially through the base-emitter junction of the transistor 162 and biases it on. This holds the regulator fully "on" thus preventing any power from being delivered to the load. As the voltage across the capacitor 164 increases, its charging current decreased in a linear manner. As the bias in transistor 162 decreases, it tends to turn off in a similar manner and permit load current to be delivered in a slowly increasing mode. Resistors 171, 172, and diode 173 provide a soft turn down to the load and a rate of turn-on proportional to the length of "off" time.

Resistors 174, 175, and transistor 176 serve as a detector to determine if the sense leads are connected to the battery under charge. If either sense lead is open, the charger will become inoperative. The input to resistor 172 is interconnected to calibration switches 135 and 177 by conductor 178. D.C. negative is supplied through conductor 179. Input signal from the current limit circuit is supplied through conductor 180 and the output signal returned over conductor 181.

Figure 6:
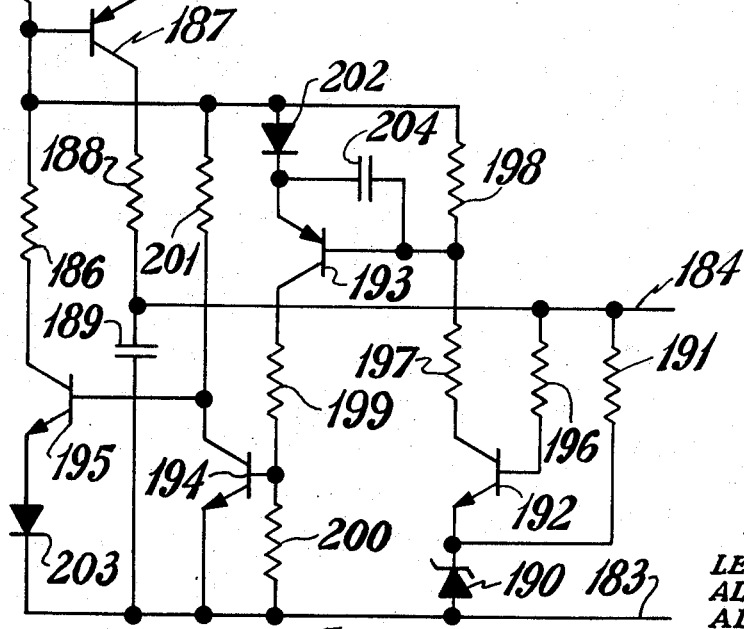
FIG. 6 is a schematic diagram of the calibration voltage supply.

In FIG. 6, conductor 182 is connected to the plus side of the power supply and conductor 183 is the negative lead. Conductor 184 is the regulated calibration voltage output. Resistor 185 and 186 provide bias for transistor 187 which is the main regulating transistor. Resistor 188 is a voltage dropping current limiting resistor and capacitor 189 is the filter for the regulated output. Zener diode 190 is a reference diode and is biased by resistor 191. Transistor 192 is a detector for the regulated voltage and is "off" until the voltage on conductor 184 reaches the regulating level and then switches "on" to turn on transistors 193 and 194. This will then turn off transistor 195 and also the transistor 187. Resistors 196, 197, 198, 199, 200, and 201 together with diodes 202 and 203 are biasing elements to stabilize the regulator point at the proper level. Capacitor 204 eliminates random noise and parasitic oscillations in the circuit.

FIG. 7 illustrates the SCR firing circuit and in as much as each phase is similar, only one will be illustrated. As previously describe A.C. voltage is connected to the primary winding 59 of transformer 60 by conductors 58 and 96. A voltage dropping resistor 205 may be inserted in the conductor 58. The transformer 60 has a secondary winding 206 phased so as to start the timing cycle for the SCR when the voltage across the SCR begins to swing positive. The timing for the phase back angle is controlled by the magnitude of the signal coming from the voltage regulator over conductor 120 and resistor 207 together through transistor 208, resistors 209, 210, 211, and capacitor 212. If the voltage is high, the time delay will be long and conversely if the voltage is low, the delay will be short. The capacitor 212 is charged up during the "off" point of the cycle by the signal voltage, from the output regulator. The voltage also biases transistor 213 "on" to keep the firing circuit in a non operating mode. During the "on" point of the cycle, the capacitor 212 discharges through resistors 209, 210, and the emitter base junction of the transistor 213 which is held on for the duration of the discharge cycle. Upon the discharge current dropping to a low level, transistor 213 will turn off. A unijunction oscillator comprising resistors 214, 215, 216, capacitor 217, and transistor 218 will be unclamped and will start to generate an output signal which is coupled through capacitor 219 into transistor amplifier 220 then to primary winding 220A of the transformer 56. Resistor 221 serves to load the transformer 56 to prevent spikes from damaging the SCR.

Diode 222 is a despiking diode to prevent voltage spikes from occurring during the relaxation period of the transformer 56.

Resistor 223 limits the current to the transformer 56 and resistor 224 serves as a bias leakage resistor to keep transistor 220 "off" during the period of no firing. Resistor 225 provides a load for transistor 213. Resistor 226 provides bias for the transistor 208 and diode 227 clamps the reverse voltage of the base-emitter junction of the transistor 208 to a safe level. Conductor 228 is the positive input level and conductor 229 is the negative input level. The output from the transformer 56 is connected by conductors 43 and 57A to the gate and cathode of the phase SCR.

Figure 8:
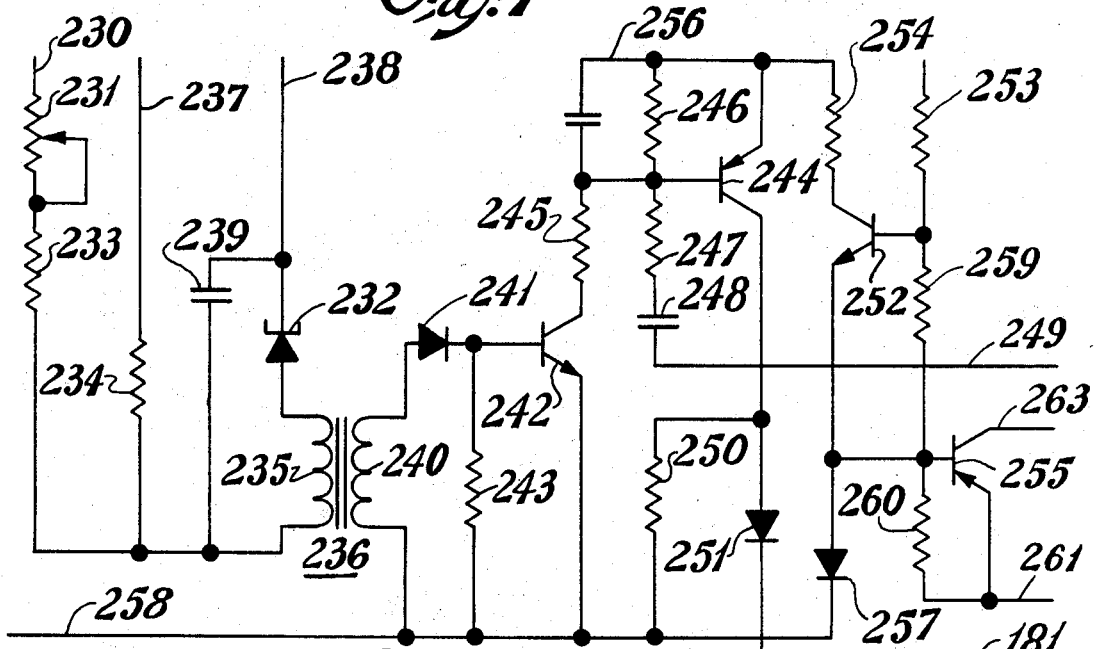
FIG. 8 is is a schematic diagram of the current limiter circuit.

FIG. 8 is the current limit circuit which converts the battery charger from a constant voltage regulated unit to a constant current regulated unit at the calibrated set point. This control prevents excessive current from being drawn by the load. Input from the calibration voltage supply is obtained through conductor 230. Resistor 231 is the adjustment setting potentiometer which sets the bias voltage of tunnel diode 232. Resistor 233 is a maximum current limiting resistor and resistor 234 is the bias voltage generating resistor across which a threshold voltage is developed to trigger the oscillations of the tunnel diode 232. The resistor 234, tunnel diode 232 and primary winding 235 of a transformer 236 are connected across meter shunt resistor 82 (FIG. 3) by conductors 237 and 238. Capacitor 239 is the oscillator timing capacitor. The transformer 236 which includes secondary winding 240, is a step up coupling transformer and also furnishes the inductance necessary for tunnel diode oscillation. Diode 241 prevents reverse spikes from damaging the bias-emitter junction of transistor 242 and also raises the impedance of the secondary circuit in its forward direction. Bias for the transistor 242 is provided by resistor 243. The transistor 242 amplifies the oscillator signals and also demodulates the signal and filters it into a D.C. voltage to bias transistor 244 "on." Resistor 245 is a current limiting load resistor for the transistor 242 and resistor 246 provides bias for the transistor 244. Resistor 247 and capacitor 248 form a feed back network which couples to the voltage regulator by conductor 249. Resistor 250 stabilizes the load of transistor 244 which amplifies the D.C. signal generated by the oscillator. Diode 251 is an isolator diode for the coupling signal to the regulator through the conductor 181 and also prevents feed back signals from the regulator. Conductor 180 returns from the voltage regulator and biases transistor 252 through resistor 253. Resistor 254 is the reverse bias cut off for transistor 252. When transistor 252 is turned on, current flows from the positive input 256 through diode 257 to the negative input 258 and transistor 255 will regulate its collector current at the selected level. Resistor 259 turns off the bias for the transistor 252. Resistor 260 provides forward bias for the transistor 255 and the forward current will flow from conductor 261 which is connected through switch 262 (FIG. 11) to negative potential in FIG. 4. The collector of transistor 255 is connected by conductor 263 to the low current limiter circuit (FIG. 10).

Figure 9:
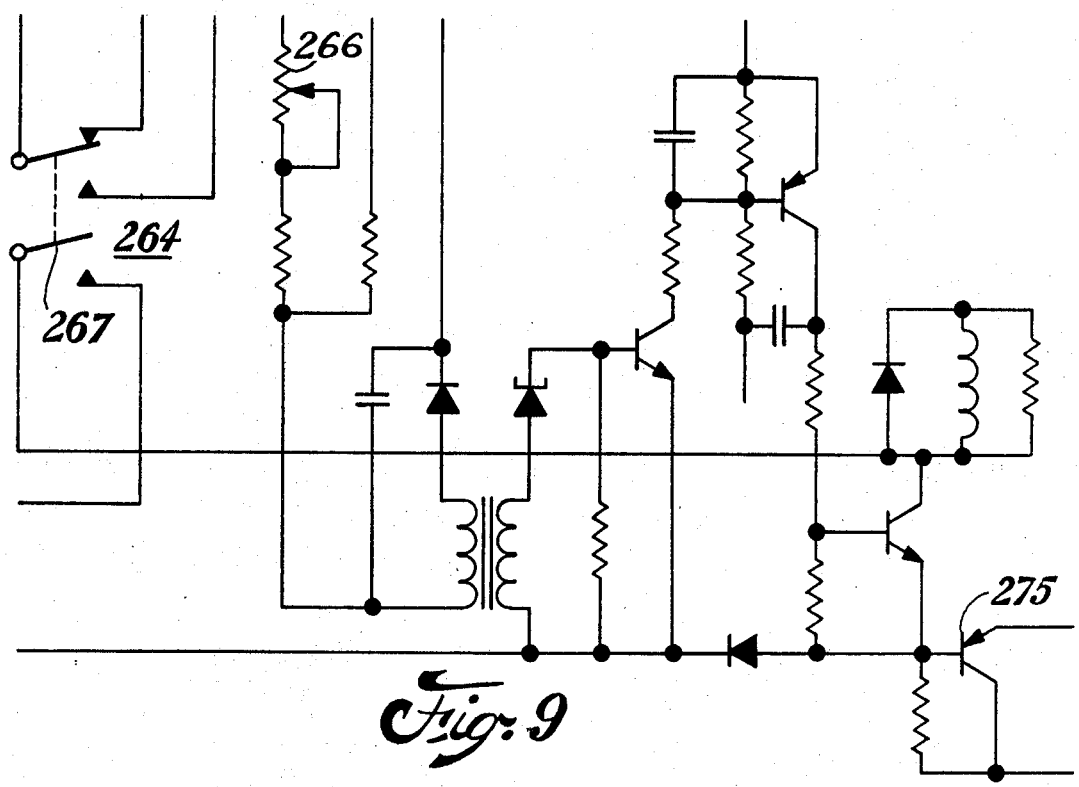
FIG. 9 is a schematic diagram of the high current circuit.

FIG. 9 illustrates the high current control circuit and is basically the same as the current limiter circuit of FIG. 8 except for a relay incorporated to trip the main contactor off the line when a predetermined operating current is reached. A relay 264 has normally open contacts which will complete a circuit through alarm lamp 265 (FIG. 11) and external readout indicating that the charger is inoperative. During calibration setting, auxiliary contacts on switch 135 (FIG. 11) hold the switch 20 in and prevent trip out. Resistor 266 is adjusted to provide the predetermined current level. An auxiliary contact 267 on the relay 264 provides a lock on feature, and the charger cannot be put back on the line unless reset switch 268 (FIG. 11) is actuated.

Figure 10:
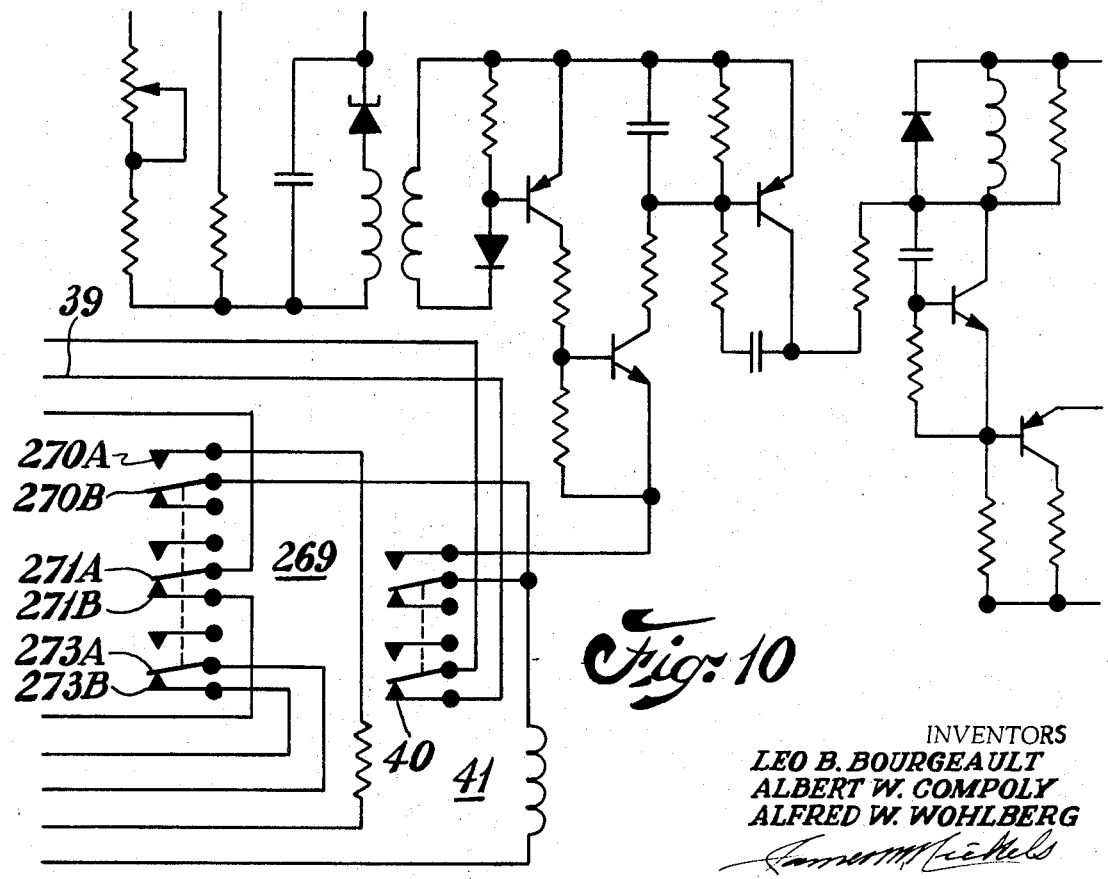
FIG. 10 is a schematic diagram of the low current circuit.

FIG. 10 illustrates the low current circuit and is also similar to FIG. 8 except it incorporates two relays. Relay 269 is the low current relay and is energized for values of load current above a predetermined point. Contacts 270A and 270B are interlocked with the turn down signal for relay 40. If the battery charger is delivering current below the low current set point, the unit cannot be turned down as the contacts are open in the circuit. Contacts 271A and 271B complete a circuit to low current lamp 272 (FIG. 11). Contacts 273A and 273B provide a circuit for external read out of the low current status.

FIG. 11 is the calibration switch and display panel. Switch 268 is the reset switch for canceling either a high current or a turn down signal. Switch 262 is the current limit calibration test switch. To calibrate the current, limit switch 263 is actuated to put a current through transistor 255. The magnitude of the test current can be varied by resistor 231. The high current control is calibrated by actuating switch 135 and adjusting resistor 266. Contacts 274A and 274B of switch 134 complete the test circuit for current to flow through the collector emitter junction of transistor 275 of FIG. 9 at the level set by resistor 266. Transistor 275 acts as a current regulator in the circuit. Contacts 276A and 276B provide a ground and break the coil holding current for the relay 264 which actuates to make a ground connection for switch 20 which holds it on during calibration. Contacts 277A and 277B complete a discharge path for capacitor 164 (FIG. 5) that produces a controlled slow, turn down during calibration.

Actuation of switch 177 permits the setting of the low current operating point and also completes the circuit for the slow turn-down to prevent current from flowing which is normally greater than the low current set point. Switch 112 is the automatic-to-manual mode control. Contact 278 completes the circuit for a lamp readout function when the switch 112 is in the manual position. Resistor 279 is the voltage boost adjustment and is connected to conductor 142 of FIG. 5 and to an external control panel for remote operation.

The meter 280 is a voltmeter and is connected across the output of the battery charger to read the operating voltage. Meter 84 is an ammeter on which either the load current or the test current may be indicated. Light 281 indicates when the current exceeds the predetermined limit and that the system has been removed because of high current.

The aforenoted circuits embodies a new and unique method of converting A.C. power into D.C. power. The SCR's are utilized to chop the A.C. sine wave voltage into pulses before being stepped down to a lower voltage by a transformer. Circuits are incorporated for both automatic control and also manual control of the SCR gate firing signals. Tunnel diode sensing circuits detect voltage changes of less then 10 millivolts and control the output current which may be as high as 500 amperes. The tunnel diode regulation circuits are employed to supply a test current to calibrate the operating points of the safety controls. Battery charging is accomplished with a constant potential output. The output charging current will vary with the state of charge of the battery. Overcharging problems are eliminated as control circuitry automatically reduces charging current to a low trickle as the batteries reach their state of full charge.

Although a three phase system has been illustrated and described, it is understood that it could be either single phase or polyphase.

Although only one embodiment of the invention has been illustrated and disclosed, various changes in the form and relative arrangement of the parts, which will appear to those skilled in the art, may be made without departing from the scope of the invention.

What is claimed is:

1. A battery charger for charging a battery from a source of A.C. comprising an input circuit, means for connecting said input circuit to said source of A.C., means for forming said A.C. into pulses, rectifying means connected for converting said pulses into D.C., output circuit means for connecting said D.C. to said battery, a sensing circuit including tunnel diodes as the sensing elements connected to said output circuit, and a control circuit responsive to said sensing circuit to control said pulse forming circuit in accordance with the condition of said output circuit.

2. The combination as set forth in claim 1 in which said control circuits include a current limit circuit, a high current alarm circuit, and a low current alarm circuit.

3. The combination as set forth in claim 1 and including means for maintaining a constant potential output for said charging current.

4. The combination as set forth in claim 1 and including means for shutting down the system upon the occurrence of a malfunction in the system.

5. The combination as set forth in claim 1 and including means for providing a readout function.

References Cited

UNITED STATES PATENTS

| | | | |
|---|---|---|---|
| 2,898,539 | 4/1959 | Lozeau | 320—48 X |
| 3,317,793 | 5/1967 | Peek et al. | 317—31 |
| 3,321,698 | 5/1967 | Merkel | 34—16 |
| 3,300,704 | 1/1967 | McMillen | 320—61 |
| 3,372,324 | 3/1968 | Scarlett | 320—39 |
| 3,378,750 | 4/1968 | Hastings | 320—39 X |
| 3,018,432 | 1/1962 | Palmer | 323—66 |
| 3,304,488 | 2/1967 | Henderson et al. | 307—322 X |
| 3,230,440 | 1/1966 | Kleiner | 317—33 X |
| 3,309,599 | 3/1967 | Broomhall | 321—18 X |
| 3,390,321 | 6/1968 | Plow | 321—18 X |

OTHER REFERENCES

Vinal-Storage Batteries, 4th ed., 1955, p. 246 relied on.

J D MILLER, Primary Examiner

J. M. GUNTHER, Assistant Examiner

U.S. Cl. X.R.

321—24